United States Patent [19]
Braginetz

[11] 3,808,944
[45] May 7, 1974

[54] MECHANICAL GEOMETRIC GENERATOR FOR TROCHOIDS EMPLOYING A BI-LINEAR RADIAL CO-ORDINATE SYSTEM

[76] Inventor: Paul A. Braginetz, 214 Oak Ridge Cir., Staunton, Va.

[22] Filed: Mar. 30, 1973

[21] Appl. No.: 346,244

[52] U.S. Cl. .................. 90/15 A, 33/27 R, 50/90
[51] Int. Cl. ........................ B23c 3/02, B24b 5/00
[58] Field of Search ...... 90/15 R, 15 A, 15 B, 11 R; 33/27 R, 30 D; 51/90; 408/54

[56] References Cited
UNITED STATES PATENTS

| | | | |
|---|---|---|---|
| 3,589,237 | 6/1971 | Strohecker et al. | 90/15 R |
| 2,870,578 | 1/1959 | Baier | 51/90 |

*Primary Examiner*—Gil Weidenfeld
*Attorney, Agent, or Firm*—Cushman, Darby & Cushman

[57] ABSTRACT

The disclosure embraces a grinding apparatus for forming or finishing the surface of a workpiece where the forming tool is adjustably mounted on a carriage assembly which moves the forming tool while the workpiece remains stationary; the carriage assembly consists of a carriage arm which is pivotably and adjustably connected at its extremities to planetary gears which in turn are drivingly connected to a sun gear; the connections of the carriage arm to the planetary gears is rendered adjustable so that when the planetary gears are moved about the sun gear in an orbital path the trace of the forming tool will follow that of a bi-lobed trochoid in the plane in which the surface of the workpiece is situated. Adjustment means are provided so that the size of the major and minor axes of the trochoidal path of the forming tool can be varied over a wide range.

9 Claims, 5 Drawing Figures

3,808,944

MECHANICAL GEOMETRIC GENERATOR FOR TROCHOIDS EMPLOYING A BI-LINEAR RADIAL CO-ORDINATE SYSTEM

BACKGROUND AND BRIEF DESCRIPTION OF THE INVENTION

The present invention relates to a mounting and drive mechanism for a forming tool such as a grinder, finisher or milling tool. More specifically, the apparatus of the present invention provides an adjustable mounting for a forming tool so that the working element of the tool can be moved through a trochoidal path of any desired size and with the required degree of accuracy.

In employing machine elements to form a workpiece to a desired contour, it has been the general practice to either employ a template for guiding the forming tool relative to the workpiece or to provide a stationary tool and rely on relatively complex movable mounting arrangements to cause the workpiece to traverse a predetermined path relative to the stationary tool.

The use of templates for guiding a tool has suffered from the disadvantage that such templates are expensive to construct, particularly, where an assembly plant has required the use of a large number of such templates to carry out the mass production of an article. It can be readily appreciated that once a template has been formed, its application is limited to a single type of article shape. Accordingly, attempts have been directed towards methods of inexpensively constructing such templates which has more or less adversely affected the degree of accuracy that could be obtained when they were employed. For a number of types of machining processes, it has been found desirable to mount the forming tool in a fixed position and provide mechanisms for moving the workpiece to be shaped along a predetermined path relative to the forming tool. These latter arrangements have proved to be particularly useful when relatively small dimensioned workpieces are involved. However, it is evident that for larger types of workpieces the precision obtained by moving the workpiece relative to a stationary forming tool is quickly outweighed by the cost consideration involved in providing mounting arrangements and power required to move relatively heavier workpieces.

In still other arrangements, such as that disclosed in the U.S. Pat. No. 2,870,578 to Baier, issued Jan. 27, 1959, mechanical linkages have been resorted to for moving a forming tool through a preselected path. However, just as with the previously discussed problem relating to the use of guide templates, such linkages have been capable of very little adjustment so that for a given linkage arrangement, very little, if any, variety could be obtained in the motion available to the forming tool. As a result, the utility of the linkage arrangement was restricted to a small number of possible pattern sizes, thus rendering impractical the investment required for constructing such devices especially where a complicated pattern such as a trochoid, to which the present invention pertains, was involved.

An embodiment of the apparatus of the present invention avoids the foregoing difficulties of the prior art while still providing a tool mounting device capable of moving a forming tool through trochoidal patterns of greatly varying sizes thus enabling the device to be employed with stationary workpieces of corresponding varying dimensions. In addition, the apparatus of the present invention can be set so that the forming tool will trace precisely the same path a repeated number of times for working on different workpieces while still permitting rapid alterations in the tool path so that the tool will be made to traverse a differing pattern should the need arise.

In one embodiment, the forming tool such as a grinding spindle and its associated motor are mounted on a pivoting mechanism which in turn is carried on a slide element. The slide element is mounted on parallel guide tracks of a pair of parallel extending carriage arms. The opposite ends of the carriage arms are pivotally and slidably connected to planetary gears which are mounted for rotation on a rotary annulus. The annulus is drivingly connected with the planetary gears. The pivotal connection of the end of the carriage arms to the planetary gears is rendered adjustable so that the pivotal connections of the carriage arms may be shifted towards and away from the axes of rotation of the planetary gears for the purposes of varying the eccentricity of the trochoidal pattern. The parallel carriage arms are, of course, fixed relative to each other at the pivotal connections. Means are provided for shifting the tool along the guide tracks of the carriage arms to vary the amplitude dimension of the pattern and an adjustment motor is also provided on the tool motor support element to compensate for wear on the working surface of the forming tool. A support platform for the workpiece is provided having an opening through which the forming tool is able to be projected or retracted.

As will be made more apparent hereinafter, both the pivotal mounting of the forming tool on the slide element of the carriage arms and the carriage arms themselves are important elements in the arrangement of the present invention in that, on the one hand, the pivotal mounting of the forming tool permits the very accurate obtaining of a trochoidal trace by the working surface of the forming tool and, on the other hand, the carriage arms provide the primary support for the tool and means for precisely varying the dimensions of the pattern the tool is made to follow.

DETAILED DESCRIPTION OF THE INVENTION

Figure 1:
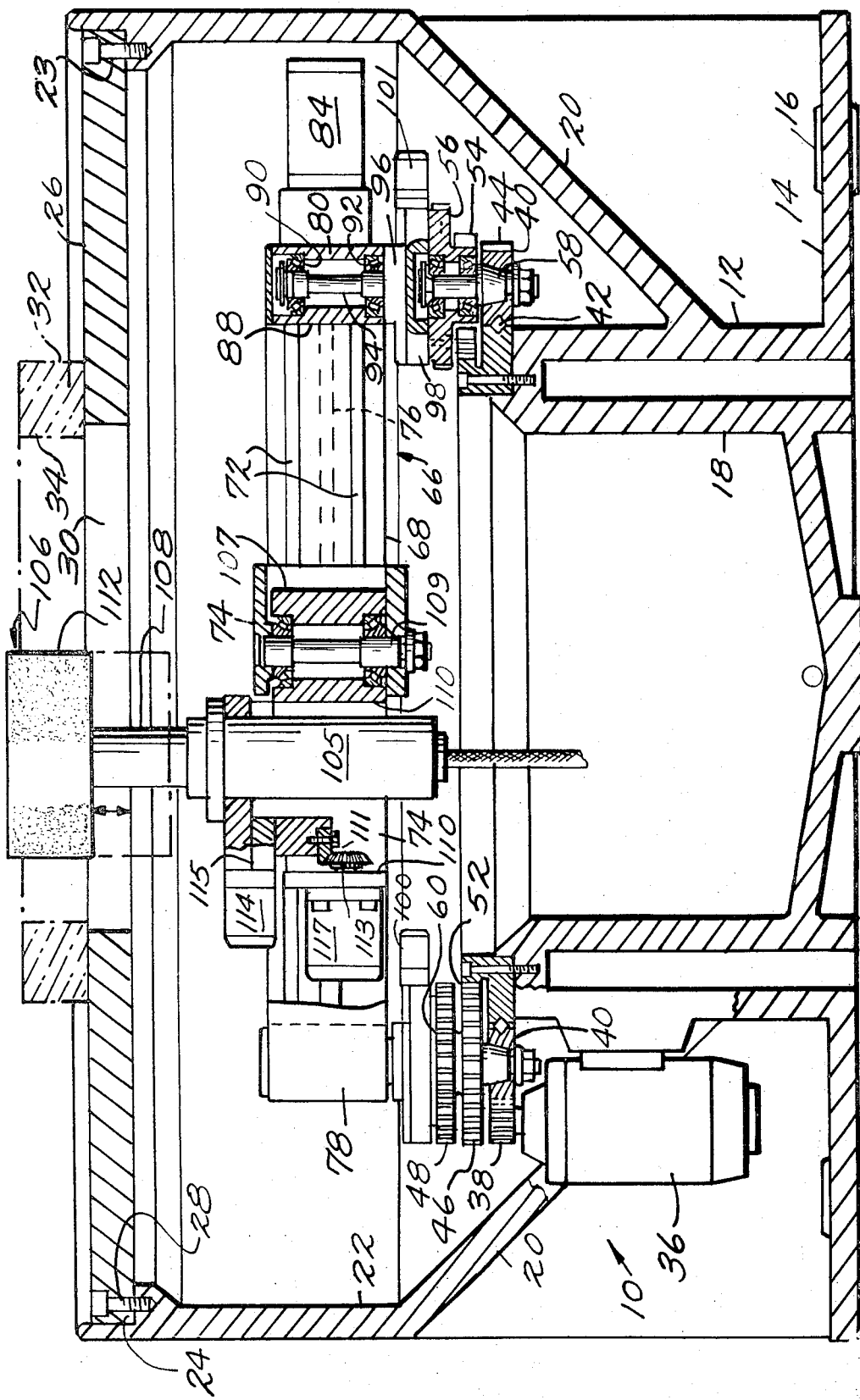
FIG. 1 is a side view, partly in section, of one embodiment of the apparatus of the present invention.

Referring now to the drawings wherein like numerals designate corresponding parts throughout there is illustrated in FIG. 1 the apparatus of the present invention designated at 10 and which consists of a support base 12 having a radial extending flange 14 provided with openings 16 thereabout to permit the secure anchoring of the support base 12.

From the exterior of the pedestal portion 18 of the support base 12 a conical support wall 20 extends which is preferably formed integrally with the exterior of the pedestal portion 18. The support wall 20 slopes upwardly and outwardly from the pedestal portion 18 and is then provided with a cylindrical wall 22 which extends vertically and surrounds the working area of the apparatus 10. Wall 22 about its upper interior edge is provided with a ledge 24 for supporting the outer periphery of a work table 26 which is preferably made of rigid material such as steel plate. Bolt holes are provided about the periphery of the work table 26 to permit securing of same to the ledge 24 as by bolts 28. The center of the work table 26 is provided with an opening 30 about which a work piece such as schematically illustrated at 32 is situated and secured in place by any suitable means such as clamps (not shown). With this arrangement the surface 34 of the workpiece that is to be contoured or finished must be spaced within the walls of the opening 30 as illustrated in FIG. 1. It will be apparent that, for larger or smaller workpieces, the size of opening 30 will vary correspondingly which can be effected by selecting a work table from a selection having a variety of different sized openings 30. Alternatively, segments can be provided for addition or removal from the edge of a predetermined sized opening 30 for accommodating differing sizes of workpieces. Also, the arrangement lends itself to being inverted with the exception of the work table 26 which would be spaced a suitable distance vertically from the carriage assembly means 66 to permit movement thereof.

Mounted on the exterior of pedestal portion 18 is a main drive motor 36 having a rotary output spindle 38 which, in the illustrated embodiment, consists of a spur gear. The rotary motion of the main drive motor is transmitted to support means in the form of an annular member 40 which is rotatably mounted about the upper portion of the pedestal 18 by means of cross roller bearings 42. Additional support structure for the annular member 40 may be required and utilized if needed. The exterior periphery of the annular member 40 is provided with gear teeth as at 44 for intermeshing with the teeth on the spindle 38 of the main drive motor 36. As will be obvious to those skilled in the art, other power transmission means such as pulleys or chain belts may be employed to impart rotation to the annular member 40.

The annular member 40 serves to support a plurality of sequentially meshing planetary gears as at 46, 48 and 50, on one side of a fixed sun gear 52 which is secured or formed integrally with the uppermost portion of the pedestal portion 18. A corresponding number of planetary gears are supported on the opposite side of the first-mentioned planetary gears as at 54, 55 and 56. Each of the planetary gears is rotatably mounted on a spindle as at 58, the base of which is securely attached to the annular member 40 so that the spindle projects substantially perpendicularly from the annular member 40. Thus, annular member 40 restricts displacement of the planetary gears to an orbital path about the fixed sun gear 52.

Figure 2:
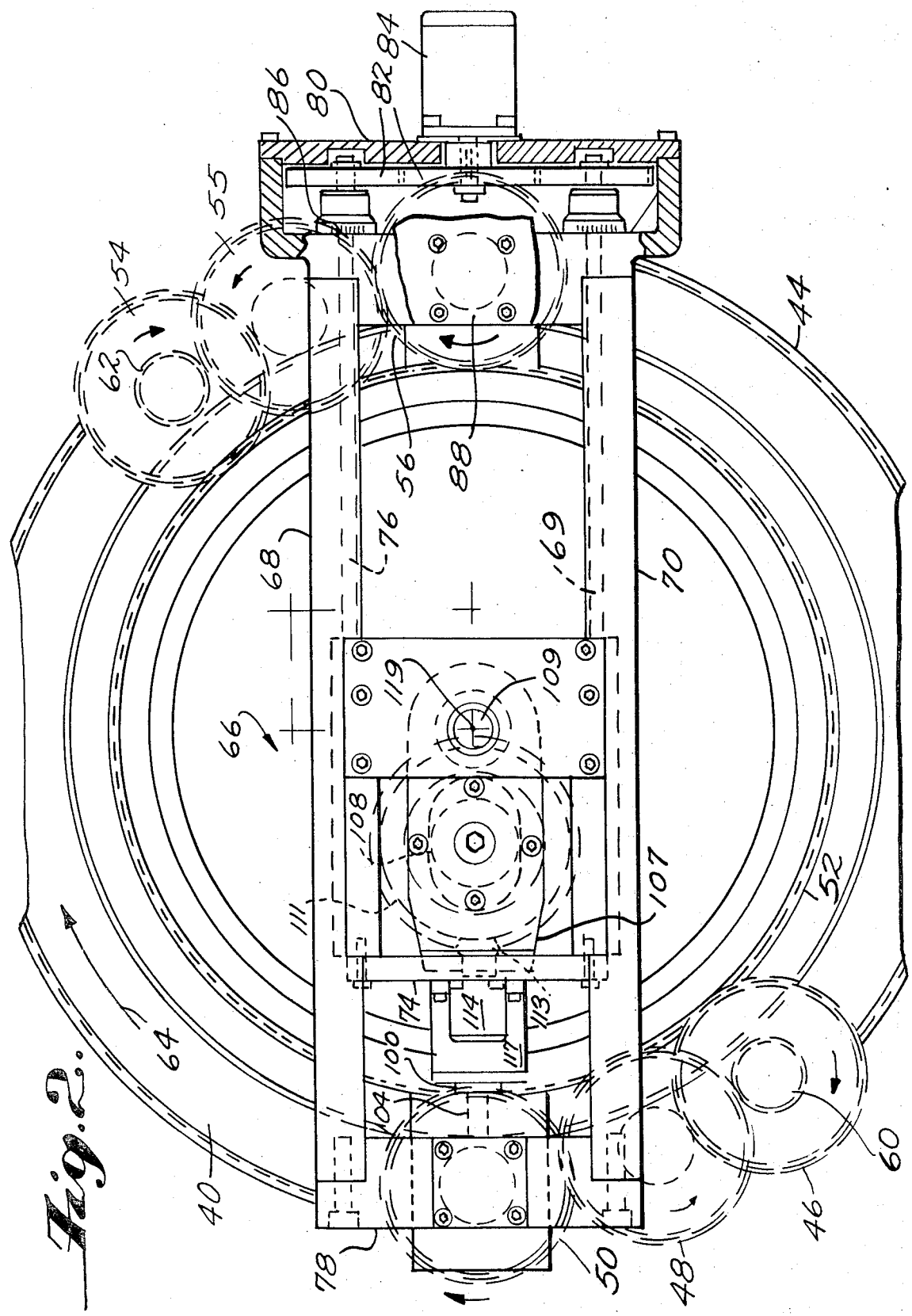
FIG. 2 is a top plan view with the work support platform and workpiece of FIG. 1 removed.

As illustrated in FIG. 2, planetary gears 46 and 54 are each provided with reduction gears 60 and 62 respectively. Planetary gears 46 and 54 are located to rotate in the same plane as the teeth of the sun gear 52 while the reduction gears 60 and 62 are disposed to rotate in a plane spaced above the plane of the sun gear 52 as are the remaining gears of the gear train namely gears 48, 50, 55 and 56. It will be appreciated, therefore, that only gears 46 and 54 mesh with the teeth of the sun gear 52.

With reference now to FIG. 2, when the annular support member 40 is rotating in the direction of arrow 64, the rotation of the respective planetary gears will be as indicated by the arrows illustrated with respect to each of the planetary gears.

Referring to FIGS. 1 and 2, the tool carriage assembly means indicated at 66 will now be described.

Tool carriage assembly means 66 is constructed with two parallel extending arms 68 and 70, two being provided for the purposes of imparting rigidity to the carriage assembly means 66. Since the arms 68 and 70 and their associated mechanisms are identical, only arm 68 will now be described but it should be understood that the following description applies equally to arm 70. Arm 68 is provided with spaced guide tracks 72 on which is slidably mounted one side of a platform 74, the other side being mounted on corresponding tracks on arm 70. A lead screw 76 is carried on arm 68 with one end of the lead screw mounted for free rotation at end 78 of carriage arm 68 while the other end of the lead screw at end 80 of carriage arm 68 is connected through reduction gears 82 to a rotary motor 84. The corresponding lead screw 69 of carriage arm 70 is similarly mounted and driven by motor 84. Platform 74 is provided with gear teeth for intermeshing with the lead screw so that rotation of the lead screws 76 and 69 will effect linear translation of the platform 74 along its guide tracks 72.

As a practical matter, it is not necessary that the lead screws 69 and 76 extend completely across carriage arms 70 and 68 respectively, since the effect of being able to shift the tool platform past the center of carriage arm assembly 66 is merely to reorient the major axis of the trochoidal pattern traces by the forming tool to an angle of 90 degrees in the plane of the workpiece.

To facilitate the positioning of the tool platform 74 its tracks 72 a graduated scale 86 is provided adjacent end 80 of arm 68. Scale 86 will be graduated in suitable units corresponding to the linear distance of the tool working element from the center of the trochoidal pattern to be traces and a measure of half the trochoidal pattern is obtainable in conjunction with the radial distance measured from the center of the planetary gears 50 & 56 to position spindles 94. This will be described subsequently by formulation.

The mounting of the ends 78 and 80 of the carriage assembly 66 on the planetary gears 50 and 56, respectively, are identical so that the following description referring to the mounting of end 80 should be understood to be fully applicable to the mounting of the opposite end 78.

Between arms 68 and 70 at end 80 of the carriage assembly 66 there is provided a housing 88 having spaced bearing assemblies 90 and 92 which engage a spindle 94 which is fixed to a slide member 96. Slide member 96 is linearly shiftable on guide tracks similar to guide tracks 72 and which are formed in a stationary member 98 which is securely attached to the planetary gear 56. The track along which slide member 96 is intended to move must lie along a diameter of the planetary gear 56 and pass through the axis of rotation of the gear 56. To effect the shifting of the carriage assembly means 66 relative to the axes of rotation of the planetary gears 50 and 56, motors may be provided as at 100 and 101 to rotate lead screws, one of which is shown in phantom line in FIG. 2 at 104 which engage fixed, intermeshing teeth on the underside of slide member 96. Graduated scales may also be provided similar to that shown at 86 for determining the extent of travel of the axis of the spindles 94 relative to the axis of rotation of the planetary gears 50 and 56. The linear degree of shifting towards and away from the axis of rotation of the planetary gears by the spindles 94 will determine the size of the minor axis of the bi-lobal trochoidal pattern traced by the tool. It will be evident that the shifting of the ends 78 and 80 of the assembly 66 must take the place contemporaneously.

By way of example, when the center of spindles 94 exactly coincide with the axis of rotation of the planetary gears 56 and 60, the path traced by the tool will be a circle having a radius equal to the distance of the tool from the center of the carriage arm assembly 66. Displacement of the axes of the spindles 94 from the axis of rotation of the planetary gears 50 and 56 will be a direct measurement of the minor axis of a bi-lobal trochoidal pattern.

For example, if the axis of the spindles 94 are linearly displaced a unit of measurement (e.g., inches or feet) from the axes of rotation of the planetary gears 50 and 56 and this unit of measure is subtracted from half of the major axis to establish the linear displacement of the center of spindle 109 which is designated line 119 (FIG. 2) tangent to the work surface 112, the work surface then will be the proper distance from the center line of the apparatus and the desired bi-lobal trochoid pattern can be obtained.

These linear distances are also obtainable by formula for any desired bi-lobed trochoid as follows:

Major Axis + Minor Axis/4 = (Diametral Arm Radial Setting)

Major Axis − Minor Axis/4 = (Eccentric Arm Radial Setting)

Angular displacement of these dimensions as linear radial distances by means of the annular member 40 permits the point locus to be generated by the bi-linear radial coordinate theory by which this apparatus derives its name and will produce the desired trochoid with the desired eccentricity.

On tool platform 74, in the illustrated embodiment is a tool 106 having a spindle shaft 108. Of course, milling and finishing tools may also be employed. Tool 106 may be powered by a motorized spindle 105. Additionally tool 106 is made retractable within the housing of motorized spindle 105 commonly called "a retractable motorized spindle" which can be electrically, air or fluid powered, etc., to facilitate the mounting of the work piece on the work table 26.

As will be evident to those skilled in this art, a side surface, such as at 112, constitutes the locus of points which actually trace the trochoidal pattern. Since this surface is subject to wear while in use, it is desirable to provide a wear compensating adjustment to shift the tool 106 and spindle 108 so that surface 112 will always follow the preselected pattern. For this purpose, a small motor 114 may be provided on platform 74 to operate through reduction gears on a lead screw connected to an auxiliary slide mechanism 115 to permit the tool 106 to be shifted along a line extending parallel to the plane of the work table 26.

To obtain a bi-lobed, trochoidal trace of the working element of the tool 106, it is necessary that the reduction gear train be such that for every 360° rotation of the planetary gears about the sun gear, a point on the planetary gears 50 and 56 will make two complete 360° rotations. This corresponds to constructing the diameters of the circles such that the ratio of the diameter of the sun gear to that of the planetary gear is 2:1. As will be apparent to those skilled in this art, for a tri-lobed trochoid, this ratio must be 3:1, etc.

In order to obtain as accurate a trace as possible, it has been discovered that it is necessary to provide a pivotal mounting for the tool 106 on platform 74 to compensate for the geometrical departure of the working surface 112 from an imaginary line of infinitily small width of tangency to the surface 34 that is being worked. To this end, motor 105 of tool 106 is mounted on support means 107 (FIG. 2) which at one end is pivotally attached to platform 74 by means of a spindle 109. At the end of support means 107 opposite its connection to spindle 109, support means 107 is provided with an ring member 111 which is provided with geared teeth for intermeshing with a spur gear 113. Gear 113 is driven by a motor 117 which is fixedly mounted on platform 74. As shown in FIG. 1, sufficient space is provided on platform 74 between the spindle 109 and the spur gear 113 to permit sliding movement of tool 106 in response to actuation of the slide mechanism through motor 114. With this arrangement, motor 117, when actuated, will effect pivoting of tool 106 about spindle 109 while the side surface 112 of the spindle 108 will always be maintained in axial alinement, that is, tangent to an axis passing through spindle 109 by virture of a shiftable movement permitted by slide 115 and motor 114.

With reference to FIG. 2, the point of tangency of surface 112 of the tool 106 that traces the trochoidal pattern coincides with a line 119 passing through the axis of spindle 109. Thus, it will be seen that for any pivotal movement of the support means 107, the working surface 112 of the forming tool 106 will always be tangent to the line 119.

Figure 4:
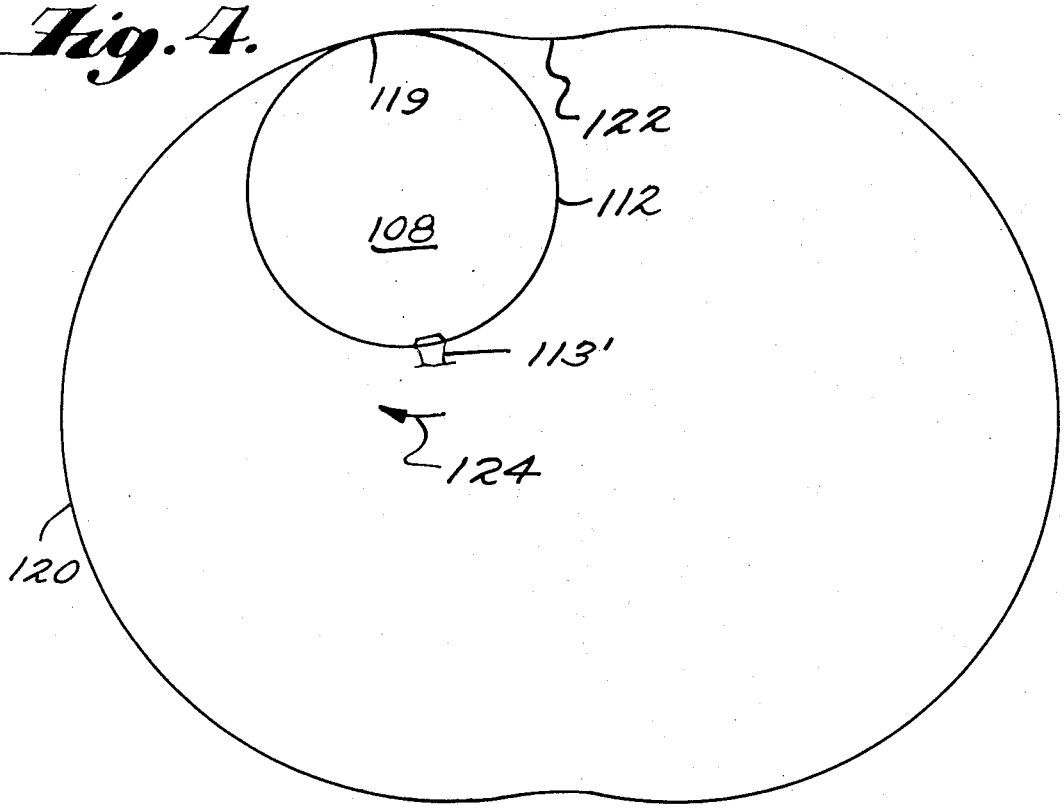
FIG. 4 is a diagrammatic representation of a trace obtained by a point on the working surface of the forming tool.

With reference now to FIG. 4, there is illustrated a bi-lobal trochoidal trace 120 with the working surface 112 of the spindle 108 of the forming tool tangent along the line 119. The spur gear 113 is illustrated schematically at 113'. As the spindle 108 approaches the dip 122 corresponding to the radial limit of the minor axis of the trochoidal trace 120, it will be appreciated that in order to maintain the narrowest point of tangency of the working surface 112 to the line 119, the support means 107 should be shifted in the direction of the arrow 124 about spindle 109.

With this arrangement, a very precise trochoidal trace will be obtained since extended contact of the working surface 112 with the surface 34 of the workpiece 32 will be avoided.

It will be appreciated that the pivoting operation carried out on support means 107 through motor 117 can be continuously programmed by regulating the motor speed as a function of the angular velocity on the annular member 40, the dimension of the major and minor axes of the trochoidal pattern and, if desired, the rate of decrease in the diameter of the tool 106 due to frictional wear, if such is known.

Figure 5:
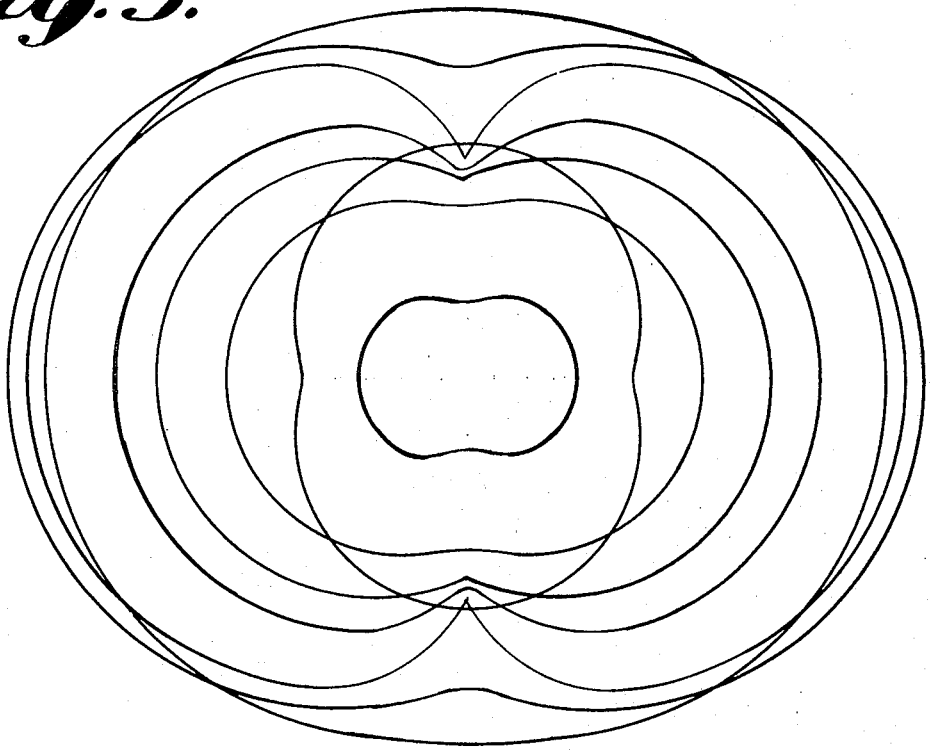
FIG. 5 is a composite, diagrammatic representation of a plurality of differently dimensioned traces capable of being obtained by the forming tool mounted according to the principles of the present invention.

The apparatus of the present invention has particular utility in forming and finishing the interior of rotary combustion engines, commonly referred to as the Wankel type, since the apparatus of the present invention can be usefully employed to contour the interior surfaces of the combustion chambers of such engines to a high degree of precision which is necessary in view of the criticality in such engines of obtaining secure seals between the moving chambers. In addition, by making the relatively simple adjustments hereinbefore described, a large number of different sized epi-trochoids as represented by traces shown in FIG. 5 can be obtained by varying the bi-linear coordinates of the system. The extreme eccentricities are not applicable to function in design of rotary combustion chambers, however, the extreme scope of the invention and theory is indicated. It can be seen that the rotaty combustion chamber can be machined with the parameters of each chamber bearing a definite proportional relationship with each other chamber.

Since the intermediate gears 48 and 55 of the gear trains of the planetary members serves merely to control the direction of rotation of the planetary gears 50 and 56, it will be evident that a different gear train arrangement may be utilized. For example, in order to obtain ellipsoid traces in the manner described in may prior U.S. Pat. No. 3,114,974 of Dec. 24, 1963, the disclosure of which is incorporated herein by reference, the intermediate gears 48 and 55 could be pivotably mounted so as to be swingable out of contact with the adjacent gears 50, 46 and 54 and 56 while the gears 46 and 54 would be shiftable so that their reduction gear members 60 and 62 could be moved into direct engagement with the planetary gears 50 and 56.

Figure 3:
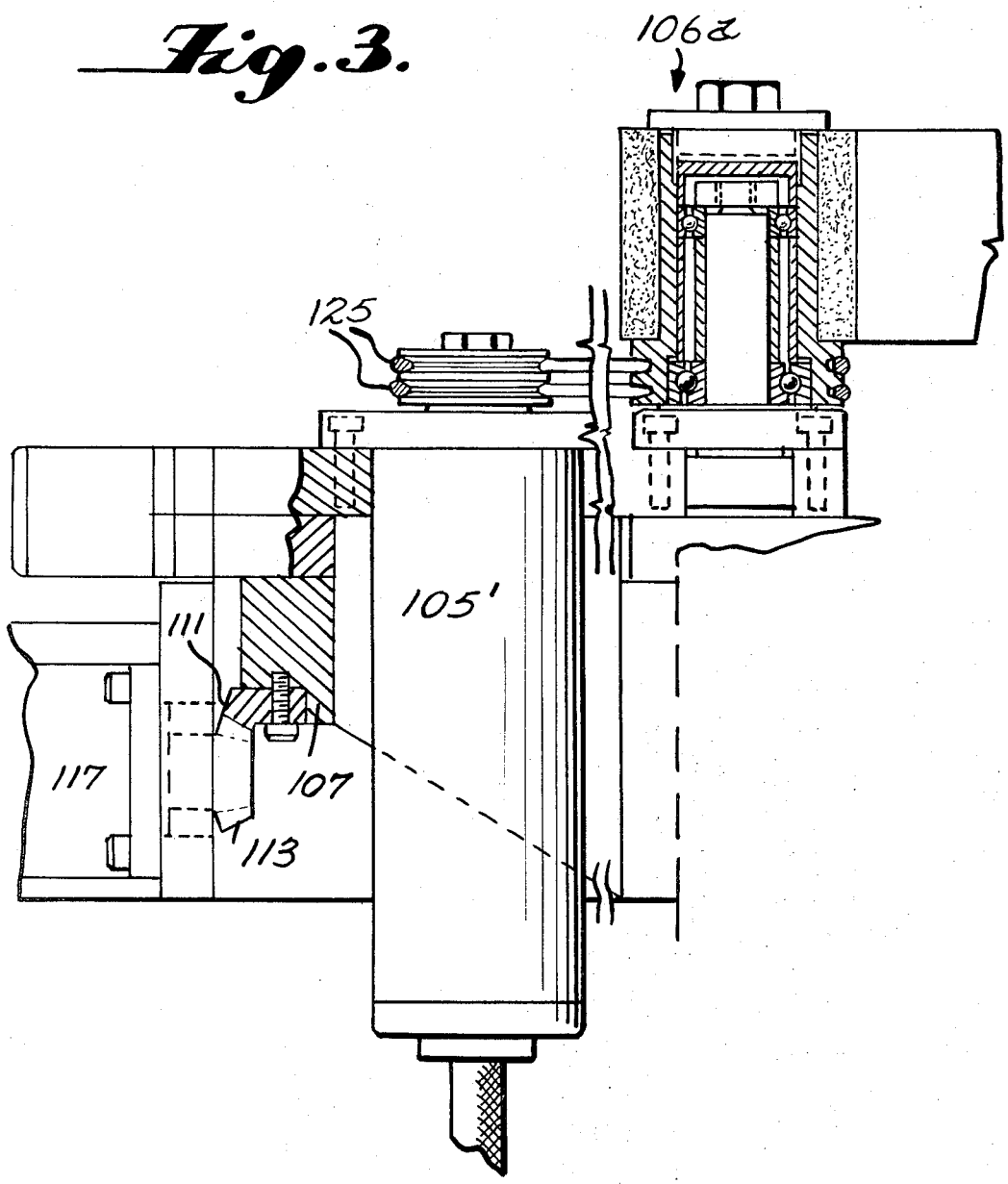
FIG. 3 is an alternate arrangement for imparting rotary motion to the forming tool.

Referring to FIG. 3, there is illustrated an alternate arrangement for driving a tool 106A which consists of employing double pulleys 125 which will permit the utilization of any distance between the tool 106A and its associated drive motor 105' thus allowing for greater reduction in the diameter of the grind wheel before replacement is necessary.

Although there has been disclosed an exemplary embodiment of the present invention for the purposes of illustration, it should be understood that various changes may be made in the size and proportion of the several parts and in the details of construction thereof without departing from the spirit of the invention as defined by the claims which follow. I claim:

1. An apparatus for working a surface of a stationary workpiece so that the worked surface will define a trochoidal shape, comprising:
    a support structure having a portion for supporting a workpiece in a given plane,
    an annular member having an external driving surface mounted on said support structure, at least one pair of discs disposed at diametrically opposite sides of said driving surface,
    support means for said discs associated with said annular member for restricting bodily displacement of said discs with respect to said annular member to an orbital path about the circumference of said driving surface, means rotatably mounting said discs on said support means, a driving connection between said driving surface and said discs for rotating said discs as they are moved in said orbital path, carriage arm means extending from one of said discs to the other disc, said carriage arm means being pivotally connected to each of said discs, means for shifting the pivotal connection of said carriage arm means to said discs toward and away from the axes of rotation of each of said discs.
    tool means mounted on said carriage arm means for working the surface of a workpiece carried on said portion of said support structure.

2. The apparatus as claimed in claim 1 wherein said support means for said discs comprises a second annular member extending around the exterior of said first-mentioned annular member and mounted for rotation relative to said first-mentioned annular member.

3. The apparatus as claimed in claim 2 wherein motive means having a rotary output is provided on said support structure and said rotary output is drivingly connected to said second annular member.

4. The apparatus as claimed in claim 1 wherein said carriage arm means is provided with a guide track extending substantially parallel to said given plane between said discs, said tool means being mounted to be moveable along said guide track.

5. The apparatus as claimed in claim 4 wherein said tool means includes a support member, said support member being mounted to move along said guide track, said support member having a guide track which extends substantially perpendicular to the path of said guide track on said carriage arm, and means for moving said tool means along said guide track on said support member independently of movement of said support member's movement along said guide track on said carriage arm.

6. The apparatus as claimed in claim 1 wherein said means for shifting said pivotal connections of said carriage arm means to said discs includes a guide track on each of said discs which passes through the axis of rotation of the disc and is perpendicular thereto, a slide platform mounted in each of said guide tracks, a said pivotal connection of said carriage arm means being mounted on a said slide platform, and motor means drivingly connected to each of said slide platforms for moving said platforms along their respective guide tracks on said respective discs.

7. The apparatus as claimed in claim 1 wherein said tool means includes a circular forming surface with the periphery of said surface extending substantially parallel to a plane that is substantially perpendicular to said given plane; said tool means further including a support member which is movable along said carriage arm means, said tool means being pivotably mounted on said support member to pivot about an axis which extends substantially perpendicular to said given plane.

8. The apparatus as claimed in claim 7 wherein means are provided on said support means for moving said tool means substantially parallel to said given plane so that said forming surface of said tool means may be maintained substantially tangent to a point lying on said axis about which said tool means is pivotably mounted.

9. An apparatus for working a surface of a stationary workpiece so that the worked surface will define a trochoidal shape, comprising:
    a support structure having a portion for supporting a workpiece in a given plane,
    an annular member having an external sun gear mounted on said support structure, at least on pair of gear discs disposed on diametrically opposite sides of said sun gear,
    an annular support ring for said gear discs associated with said annular member for restricting bodily displacement of said gear discs with respect to said annular member to an orbital path about the circumference of said sun gear, means rotatably mounting said gear discs on said support ring, said gear discs being in driven connection with said sun gear discs being in driven connection with said sun gear whereby rotation of said support ring relative to said sun gear will effect rotation of said gear discs as said gear discs are moved in said orbital path, a pair of parallel extending carriage arms extending from one of said gear discs to the other of said gear discs, said carriage arms being pivotally connected to each of said gear discs, means for shifting the pivotal connection of said carriage arms to said discs towards and away from the axes of rotation of each of said gear discs, a tool carrier slidably mounted on said carriage arms, means for moving said tool carrier along said carriage arms, said tool carrier having pivot means thereon and an arm member pivotable about an axis on said pivot means, said axis extending perpendicular to said given plane, a forming tool mounted on said tool carrier, said forming tool having a forming surface extending substantially perpendicular to said given plane, said pivotable arm member having means for shifting said forming tool towards and away from said pivot means in a plane extending generally parallel to said given plane.

* * * * *